United States Patent [19]
Beaverson et al.

[11] Patent Number: 5,809,795
[45] Date of Patent: Sep. 22, 1998

[54] FUZZY LOGIC LIQUID LEVEL CONTROL

[75] Inventors: Gregory K. Beaverson; Craig N. Shores, both of York; Russel P. Wueschinski, Dover, all of Pa.

[73] Assignee: York International Corporation, York, Pa.

[21] Appl. No.: 832,694

[22] Filed: Apr. 11, 1997

Related U.S. Application Data

[60] Provisional application No. 60/015,347 Apr. 12, 1996.
[51] Int. Cl.$^6$ ..................................................... F25B 41/04
[52] U.S. Cl. .............................................. 62/218; 62/222
[58] Field of Search ............................ 62/222, 218, 210, 62/204, 219, 220, 221

[56] References Cited

U.S. PATENT DOCUMENTS

| | | | |
|---|---|---|---|
| 2,016,056 | 10/1935 | Small | 62/126 |
| 3,381,491 | 5/1968 | Harnish | 62/218 |
| 3,391,547 | 7/1968 | Kingston | 62/218 |
| 5,138,846 | 8/1992 | Ogawa et al. | 62/148 |
| 5,156,013 | 10/1992 | Arima et al. | 62/148 |
| 5,224,352 | 7/1993 | Arima et al. | 62/141 |
| 5,259,210 | 11/1993 | Ohya et al. | 62/212 |
| 5,263,333 | 11/1993 | Kubo et al. | 62/160 |
| 5,435,145 | 7/1995 | Jaster | 62/115 |
| 5,440,891 | 8/1995 | Hindmon, Jr. et al. | 62/117 |
| 5,442,926 | 8/1995 | Kawai et al. | 62/211 |
| 5,449,495 | 9/1995 | Goto | 422/111 |
| 5,499,508 | 3/1996 | Arai et al. | 62/114 |
| 5,655,379 | 8/1997 | Jaster et al. | 62/218 X |

OTHER PUBLICATIONS

Emanuel S. Savas, Ph.D., *Computer Control of Industrial Processes*, McGraw–Hill, pp. 12, 13.

*Primary Examiner*—Harry B. Tanner
*Attorney, Agent, or Firm*—Finnegan, Henderson, Farabow, Garrett & Dunner, L.L.P.

[57] ABSTRACT

Chiller operating efficiency is optimized by controlling the system to maintain the condenser liquid refrigerant level at a value which will minimize or prevent gas bypass to the evaporator. This is accomplished by sensing the level of liquid refrigerant in the condensor and incorporating fuzzy logic to properly position a multi-position valve which can variably restrict the flow of this liquid into the evaporator, according to this sensed parameter. The fuzzy logic utilizes as inputs both the level error from a set point level and the rate of change of the sensed level. Each of these inputs are combined by fuzzy logic techniques to provide the required output signal to control the opening and closing of the valve.

21 Claims, 9 Drawing Sheets

*ADJUSTABLE

|  | $\xi N$ | $\xi Z$ | $\xi P$ |
|---|---|---|---|
| $d\xi N$ | C | C | X |
| $d\xi Z$ | C | X | O |
| $d\xi P$ | X | O | O |

RULE CONTRIBUTION
O = PULSE VALVE MOTOR OPEN
C = PULSE VALVE MOTOR CLOSED
X = NO ACTION (RULE NOT EVALUATED)

FIG. 3

|  | $\xi$N<br>0 | $\xi$Z<br>50 | $\xi$P<br>50 |
|---|---|---|---|
| d$\xi$N=60 | C2=0=<br>MIN ($\xi$N, d$\xi$N)<br>=MIN (0, 60) | C1=50=<br>MIN $\xi$Z, d$\xi$N)=<br>MIN (50, 60) | X |
| d$\xi$Z=40 | C3=0=<br>MIN ($\xi$N,d$\xi$Z)<br>=MIN (0, 40) | X | O1=40=<br>MIN ($\xi$P, d$\xi$Z)<br>=MIN (50, 40) |
| d$\xi$P=0 | X | O3=0=<br>MIN ($\xi$Z, d$\xi$P)<br>=MIN (50, 0) | O2=0=<br>MIN ($\xi$P, d$\xi$P)<br>=MIN (50, 0) |

MAX ($C_1$, $C_2$, $C_3$) = MAX (50, 0, 0) = 50

MAX ($O_1$, $O_2$, $O_3$) = MAX (40, 0, 0) = 40

FIG. 4

FUZZY LOGIC LIQUID LEVEL CONTROL

BACKGROUND OF THE INVENTION

This application is based on U.S. Provisional application No. 60/015,347, titled, "Fuzzy Logic Liquid Level Control" and filed Apr. 12, 1996, which is herein incorporated by reference.

A. Field of the Invention

The present invention relates generally to control of a mechanical refrigeration liquid chiller. More particularly, the present invention relates to a fuzzy logic liquid level control device for use in a mechanical refrigeration liquid chiller, to control the level of a condenser liquid refrigerant to prevent gas escape from the condensor.

B. Description of the Prior Art

Refrigerant liquids are commonly used in mechanical refrigeration liquid chillers. It is desirable to control the flow of such refrigerant to achieve optimum and efficient operations.

At least some prior systems have used liquid surface sensors to measure a refrigerant level. To applicant's knowledge, none precisely and optimally control the level of refrigerant flow in a refrigerant cooler system by using a liquid sensor and fuzzy logic that utilizes the sensed values as a variable input.

SUMMARY OF THE INVENTION

Systems and methods consistent with the present invention include a refrigerant system having an evaporator, a compressor, a condenser, and an expansion device (such as a valve) all connected in a closed refrigeration circuit. As is known, the refrigerant flows through the system and often accumulates in the condenser and the evaporator. In the invention, a liquid level sensor is positioned in the condenser and measures a level of the refrigerant liquid. An expansion device or chamber is positioned between the evaporator and the condenser and includes a variable-flow valve positioned within it. One such valve is a butterfly valve which can be selectively opened or closed in progressive steps by a motor, solenoid, or similar actuator associated with or incorporated as part of the valve. The valve is controlled via the actuator by a microprocessor that receives one or more output signals from the liquid level sensor and controls the position of the valve to vary the restriction applied to the refrigerant and thereby control the flow of refrigerant between the evaporator and the condenser, according to preselected criteria. Preferably, the microprocessor determines a desired position of the valve using a fuzzy logic algorithm which operates according to sensed liquid level in the condenser, and its rate of change.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

In the drawings:

FIG. 3 shows an example of a fuzzy logic truth table in accordance with this present invention;

FIG. 4 shows a fuzzy logic truth table in accordance with a specific example of the present invention.

DESCRIPTION OF THE PREFERRED EMBODIMENTS

The present invention was developed as a control for a centrifugal chiller system. It will be appreciated that the present invention may have other applications.

Reference will now be made in detail to the presently preferred embodiment of the invention, an example of which is illustrated in the accompanying drawings. Wherever possible, the same reference numbers will be used throughout the figures of the drawings to refer to the same parts.

Figure 1:
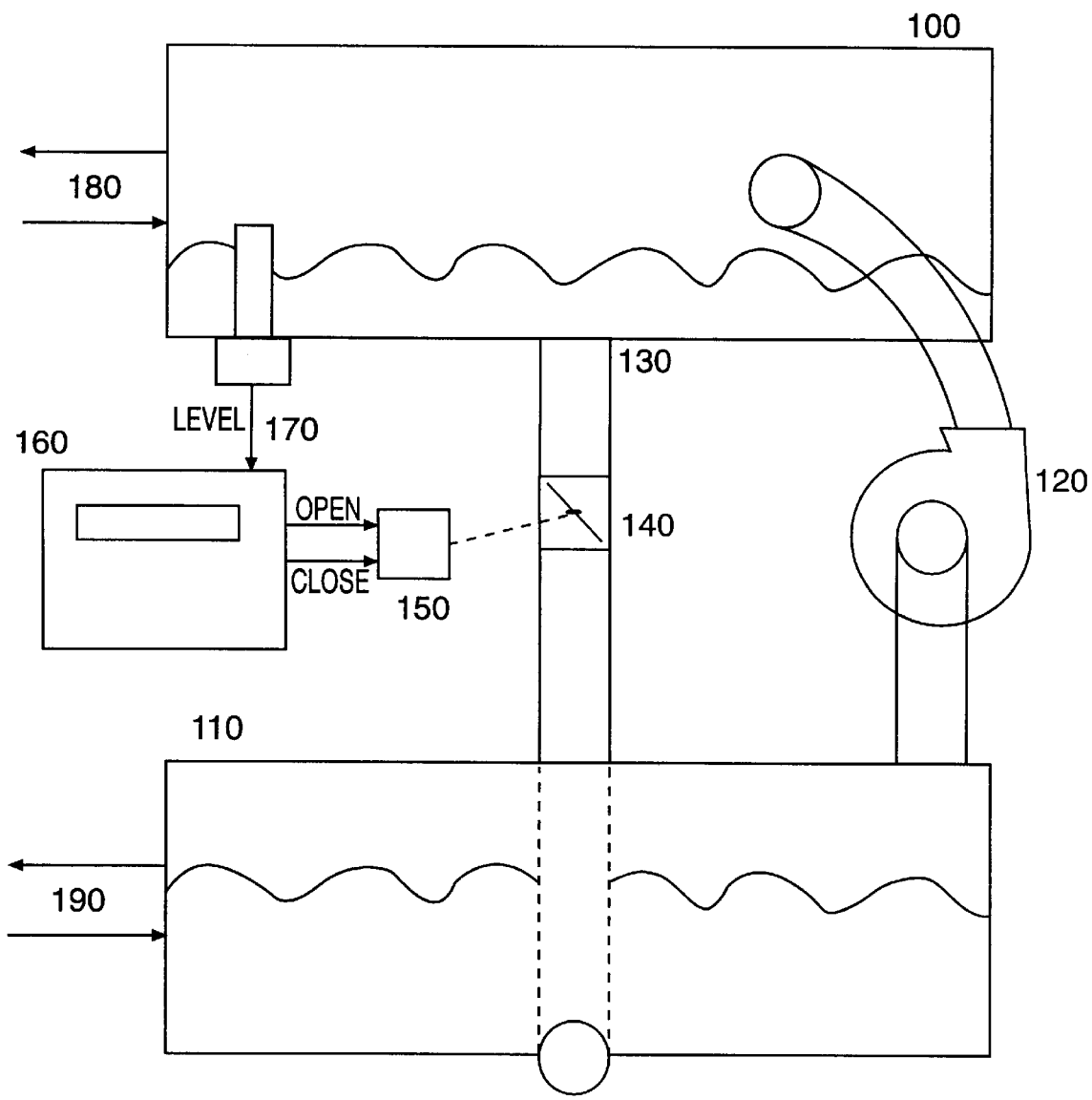
FIG. 1 is an overall system diagram of a mechanical refrigeration liquid chiller.

The liquid level control system of the present invention is depicted in FIG. 1 in its application to a refrigeration system. The refrigeration system includes a condenser 100, an evaporator 110, a centrifugal gas compressor 120, and an expansion device or chamber 130 including valve 140, all interconnected in a conventional closed refrigeration circuit. Preferably, the restriction device is a multi-position valve, such as a butterfly valve, which can vary the resistance to flow and thus vary flow of refrigerant. Such butterfly valves made are readily available, an example being D-200 butterfly valves made and offered by Norriseal. Valve controller 150 opens and closes the valve 140 (relative to its previous position) based on signals received from a control, such as a microprocessor 160. The valve controller can be a motor, solenoid, or similar actuator, as are known and available. One example of such an actuator is a Barber Colman MP-481 or 487 damper actuator, which is a readily available motor that turns as long as a pulse (an acceptable AC signal applied for a given period of time) is present. A DC signal may be applied for different types of motors. In a preferred embodiment of the invention, the microprocessor sends a signal in the form of pulses which cause the actuator to open and close in direction proportional to the pulses received by the actuator. In the alternative, other signals and actuators can be used, provided that the valve opens and closes proportionately to the received signal.

A refrigerant sensor 170 is used to detect the amount of liquid refrigerant in the condenser. Preferably, the sensor is a liquid level sensor located within the condenser 100. The sensor outputs a signal to the microprocessor 160. Examples of an acceptable sensor are SHP and SVP level transducer probes, made and offered by Hansen Technologies Corporation. Such sensors are directly inserted into refrigerant receivers, in this case the condenser, and provide continuous and accurate measurement of the refrigerant level. Such sensors are capacitance type level transducers. Because the potential to store electricity is far greater for refrigerant liquid than that of vapor, capacitance changes nearly proportionally with the refrigerant liquid level.

In operation, refrigerant gas is compressed in compressor 120 and delivered to condenser 100 where it is exposed to a cooling medium, such as water 180 from a cooling tower (not shown), and condensed to a liquid refrigerant. The liquid refrigerant passes to the expansion device or chamber 130 in order to decrease its pressure to that of the evaporator 110. The refrigerant expands as it passes through expansion chamber 130 in route to evaporator 110. As the refrigerant flows through evaporator 110, circulating water 190 from a building's air conditioning equipment enters into heat exchange relationship with the refrigerant and is thereby cooled. The refrigerant is vaporized and returned to a suction inlet of the compressor 120. In this manner, water is chilled in evaporator 110 for circulation through air cooling units throughout a building. In order to vary the amount of building cooling in response to changes in the cooling demand or load, the capacity of compressor 120 is controlled, as is known.

The flow of a liquid or gas through an obstruction like restrictor 130, 140 is dependent upon the pressures upstream and downstream from the obstruction and on the amount of resistance to flow due to the obstructions' geometry. Therefore, the flow of refrigerant liquid through the expansion device is dependent on the pressure in the condenser 100 and the evaporator 110 and on the geometry and positioning of the valve 140. By adjusting the positioning of the valve, the amount of resistance to the flow of the refrigerant liquid changes. The control system positions the valve 140 such that the resistance to fluid flow in the expansion chamber 130 matches that required to minimize, if not totally eliminate, any flow of gas refrigerant to the evaporator. In the disclosed embodiment, this is achieved by controlling the valve in a manner that seeks to keep the refrigerant liquid level in the condensor at a predetermined setpoint level. The microprocessor 160 provides two potential relative output signals, open and close, to drive the valve actuator 150, preferably in accordance with an output of a fuzzy logic algorithm. At any given time interval, the microprocessor output causes the valve to open a given amount relative to its previous position, close a given amount relative to its previous position, or remain unchanged. As explained below, the microprocessor makes this determination based on the sensed liquid level and rate of change of the liquid level, preferably according to a fuzzy logic algorithm.

Liquid level sensor 170 measures a level of the refrigerant liquid in the condenser 100. The sensors preferably are capacitance level transducers. The preferred probe contains two electrodes separated by the refrigerant liquid. The refrigerant liquid causes the capacitance of the probe to change nearly proportionally to the refrigerant liquid level. The probe outputs a voltage reflecting a level of the liquid detected. The microprocessor 160 can use the output of the sensor to determine the level of liquid refrigerant and, a liquid level error (the difference between the actual liquid level and an optimum preselected level), and the rate of change of liquid level.

If the valve 140 is closed too far, the liquid in the condenser 100 builds up creating the possibility of evaporator starvation, and if the valve 140 is open too far the refrigerant liquid level in the condenser 100 will drop causing gas to bypass to the evaporator 110. When gas bypass occurs, the compressor 120 must perform more work, and heat, to support the gas flow. This decreases the overall chiller operating efficiency. Therefore, the microprocessor 160 is programmed with the ideal liquid level set point.

Microprocessor 160 stores and uses a fuzzy logic algorithm to control the valve 140. This algorithm determines whether to cause the valve to be more open, more closed, or the same, with the desire of obtaining the ideal liquid level set point. The proper level setpoint is a function of the chiller design and is selected to prevent bypass of gas refrigerant to the evaporator. For a given chiller, the proper level of refrigerant can be best determined by actual experimental observation and testing of a chiller. When gas bypass occurs, the compressor must do work to support this gas flow. However, no additional cooling capacity is obtained. This decreases the chiller overall operating efficiency. When the valve is positioned to prevent gas bypass, achieved by maintaining the condensor liquid level setpoint, the chiller operating efficiency is optimized.

The fuzzy logic algorithm controls the desired valve position by periodically sampling the actual liquid level measured by the sensor 170 at pre-programmed intervals. For example, the programmable intervals may range from 1 to 5 seconds. By sampling the output of the sensor 170 and comparing the sensed values with a preselected ideal level, as well as with one or more previously stored samples of this sensed parameter, the microprocessor can calculate a liquid level error valve (lvl_error) and the rate change (lvl_rate), according to known computer techniques. The ultimate goal of the fuzzy logic algorithm is to make the liquid level error approach zero so that little or no refrigerant gas flows to the evaporator without evaporator liquid starvation, and the chiller operating efficiency is optimized. During each sample interval, the fuzzy logic algorithm of the microprocessor 160 determines the degree of negative, positive and zero membership associated with each input (liquid level error and its rate of change) by assigning a weight between zero and one hundred to each input. Then, the fuzzy logic algorithm evaluates several "if then" rules that combine the degrees of membership into the appropriate course of action to be taken by the control system.

Figure 2A:
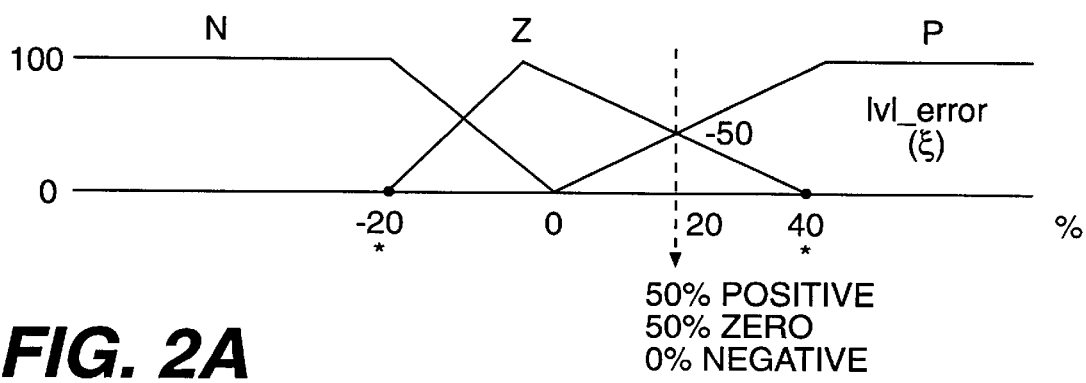
FIGS. 2(a) and 2(b) are graphs showing an example of the fuzzy logic algorithm membership function having as inputs both the error of the liquid level (difference between sensed level and predetermined optimum level) and the rate of liquid level change.
Figure 2B:
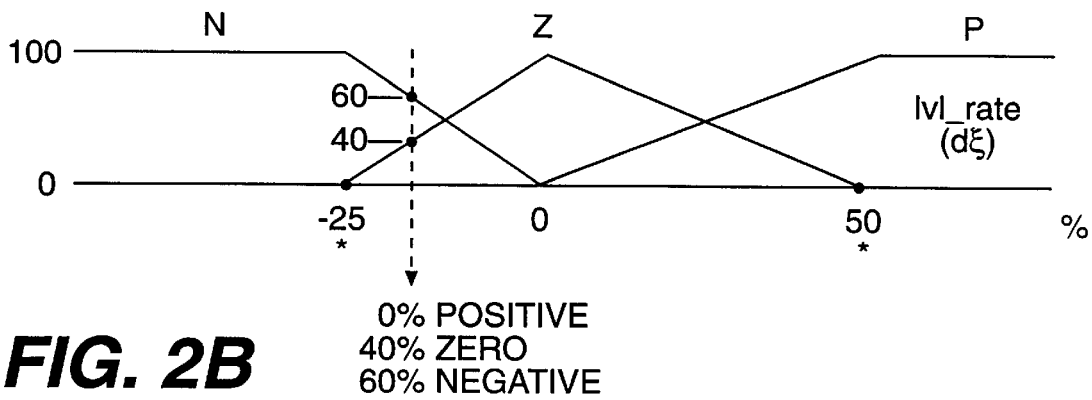

The fuzzy logic algorithm utilizes as variable inputs both a liquid level error and the liquid level error rate of change. In a preferred embodiment, three membership functions are defined for each of these two inputs. Each membership function determines in a linear fashion the degree to which the given input is zero, positive or negative. For example, as seen in FIG. 2(a), a liquid level error equal to 20% yields a membership of 50% positive, 50% zero, and 0% negative. Similarly, as shown in FIG. 2(b), a level error rate equal to −15% per sample yields a membership function of 60% negative, 40% zero and 0% positive. The membership functions shown in FIGS. 2(a) and 2(b) are not symmetric about zero and do not reflect the same degree of membership for negative values as positive values when considering inputs of equal magnitude. In general, membership functions may or may not be symmetric. These membership functions are independently programmable and may be changed in the microprocessor 160. Thus, the sensitivity of both the level error and the level error rate may be modified, both symmetrically and asymmetrically, as desired to optimize the system control, with lower values in magnitude yielding higher sensitivity and higher values yielding lower sensitivity. In one embodiment, the membership functions are chosen to control the valve in a manner that the valve opens more quickly to avoid starting the evaporator, while closing more slowly to prevent overshooting the setpoint. It is preferred to have programmable membership functions in order to have the flexibility to tune the control. A user can then change the membership functions applied by the fuzzy logic algorithm. The goal of the invention is to minimize, to the extent practicable, such flow to acceptable levels.

The table shown in FIG. 3 shows a fuzzy logic truth table which diagrams how the microprocessor 160 evaluates the fuzzy logic rules according to an embodiment of the present invention. As shown in the table, $\epsilon_N$, $\epsilon_Z$, and $\epsilon_P$ represent negative, zero, and positive level errors, respectively, and $d\epsilon_N$, $d\epsilon_Z$, and $d\epsilon_P$ represent negative, zero, and positive level error rates, respectively. The rule combinations, ($\epsilon_N$, $d\epsilon_N$), ($\epsilon_Z$, $d\epsilon_N$), and ($\epsilon_N$, $d\epsilon_Z$), contribute to pulsing closed the valve 140 to increase the liquid level in the condenser 100, whereas rule combinations, ($\epsilon_P$, $d\epsilon_Z$), ($\epsilon_P$, $d\epsilon_P$), and ($\epsilon_Z$, $d\epsilon_P$), contribute to pulsing open the valve 140 to decrease the liquid level in the condenser 100. The remaining three rule combinations are not evaluated since they result in no action. Therefore, a total of six rule combinations are evaluated utilizing a fuzzy inference minimum/maximum method. This method implies that a minimum "fuzzy AND" inferencing will be performed first for each of the six rule combinations. Then a "fuzzy OR" inferencing will be performed in which the maximum value is found for the three rule combinations that result in valve actuator close contribution, as well as for the three rule combinations that result in valve actuator open contribution, thus resulting in two maximum values representing resultant open and closed values.

The resulting two maximum values need to be combined into a single output decision, i.e., they need to be "de-fuzzified". Since the centroid method of de-fuzzification is more computationally intensive than required for this application, the singleton approach is preferably used. In the singleton approach, a single output decision is found by subtracting the valve actuator close contribution maximum value from the valve actuator open contribution maximum value. If the resultant value is less than zero, the valve actuator output signal will be pulsed on for a time which is equal to a percentage of the sampling interval in order to close the valve. If the resultant value is positive, the valve actuator open signal is pulsed on for a time equal to a percentage of the sampling interval in order to open the valve. The pulses and the time interval are chosen based on empirical evidence of the flow aspects of the system, including the valve and actuator. Ultimately, these values are best determined by actual empiracal operation and testing of chillers to which the invention is to be applied. The resultant value computed can be anywhere in the range of –100 (valve actuator close pulse width equal to sampling interval) to 100 (valve actuator open pulse equal to the sampling interval). Both the open pulse and the close pulse are never simultaneously on.

The fuzzy inferencing of the present invention will be further clarified by the following example, which is intended to be purely exemplary of the invention, and is shown in the truth table shown in FIG. 4. As can be seen in this table, the degree of membership assigned to $\epsilon_Z$(50) is combined with the degree of membership assigned to $d\epsilon_N$(60) by performing a minimum fuzzy inferencing, i.e., a fuzzy AND routine. The fuzzy AND routine results in a minimum value of 50 being assigned to a first close contribution $C_1$. The same fuzzy AND routine is applied to second and third close contributions $C_2$ and $C_3$, to obtain the value of 0 for each, as well as to obtain the values for the first, second and third open contributions $O_1$, $O_2$, and $O_3$. After the minimum fuzzy inferencing, a maximum fuzzy inferencing is performed, i.e., a fuzzy OR routine is applied to $C_1$, $C_2$, and $C_3$, or a MAX(50, 0, 0), which yields a maximum value of 50 being assigned as the combined actuator close contribution. The same maximum fuzzy inferencing is applied to open terms $O_1$, $O_2$, and $O_3$, or a MAX(40, 0, 0), which yields a maximum value of 40 being assigned as the combined actuator close contribution.

The next step of the fuzzy logic routine is to combine or "de-fuzzify" the resultant close and open contributions so that there is a single output decision. The centroid method of de-fuzzification, which is well-known in the art of fuzzy logic, may be used to achieve a single output. However, since the centroid method is more computationally intensive than required for the present application, the singleton approach is preferably used. As well-known in the fuzzy logic art, the singleton approach subtracts the close contribution (50) from the open contribution (40) resulting in the value –10. Since this value is less than zero, the valve actuator close output signal will be pulsed on for a time equal to ten percent of the sampling period. If the sampling period is four seconds then the close signal is pulsed on for 0.4 seconds.

The steps performed by the microprocessor 160 to carry out the above described fuzzy logic routine are shown in the flow charts of FIGS. 5A–5E. When a the cycle timer in the microprocessor 160 expires, the fuzzy logic routine begins (step 500). The cycle timer CYCLE_TMR is set equal to level period variable LEVEL_PERIOD set in the microprocessor in order to re-start the timer in order to trigger the next sample cycle (step 501). The level error ERROR is found by subtracting the desired liquid level percentage LEVEL_SETP, which is programmable between 20 and 80 percent, from the measured level LEVEL_CONV, which is based on the input from the level sensor 170 and is between 5 and 100 percent (step 501). If the level of the refrigerant liquid in the last timing cycle LEVEL_LAST is equal to zero (step 502), then the level of the last cycle is set to the actual measured level of the current cycle (step 503). This is done to prevent an erratic rate calculation from occurring if the fuzzy logic routine was re-entered for the first time after the system was dormant for any period of time.

The liquid level error RATE is calculated by subtracting the value of the liquid level measured during the last cycle from the liquid level measured during the current cycle (step 504). The invention, however, also contemplates a system in which a derivative of the sensed level is used as an input. The variable for the last liquid level is then set equal to the current measured liquid level for use during the next cycle of the fuzzy logic routine (step 504).

The routine next determines whether or not the level ERROR is between or equal to +/–3 percent (step 505). If the level ERROR is within this range, the level ERROR is set equal to zero (step 506), otherwise the routine determines whether or not the level rate RATE is between or equal to +/–1 percent (step 507). If so, then the error rate is set equal to zero (step 508). Otherwise, the routine compares the error value to the variable PROPORTION_LIM_CLOSE which is independently programmable from 10–50% (step 509). If the error is less than or equal to the variable PROPORTION_LIM_CLOSE, the routine sets the negative level error ($\epsilon_N$) ERROR_NEG to one hundred, and the zero level error ($\epsilon_Z$) ERROR_ZER and positive level error ($\epsilon_P$) ERROR_POS to zero (step 510) and subroutine B is entered, otherwise subroutine A is entered.

Figure 5A:
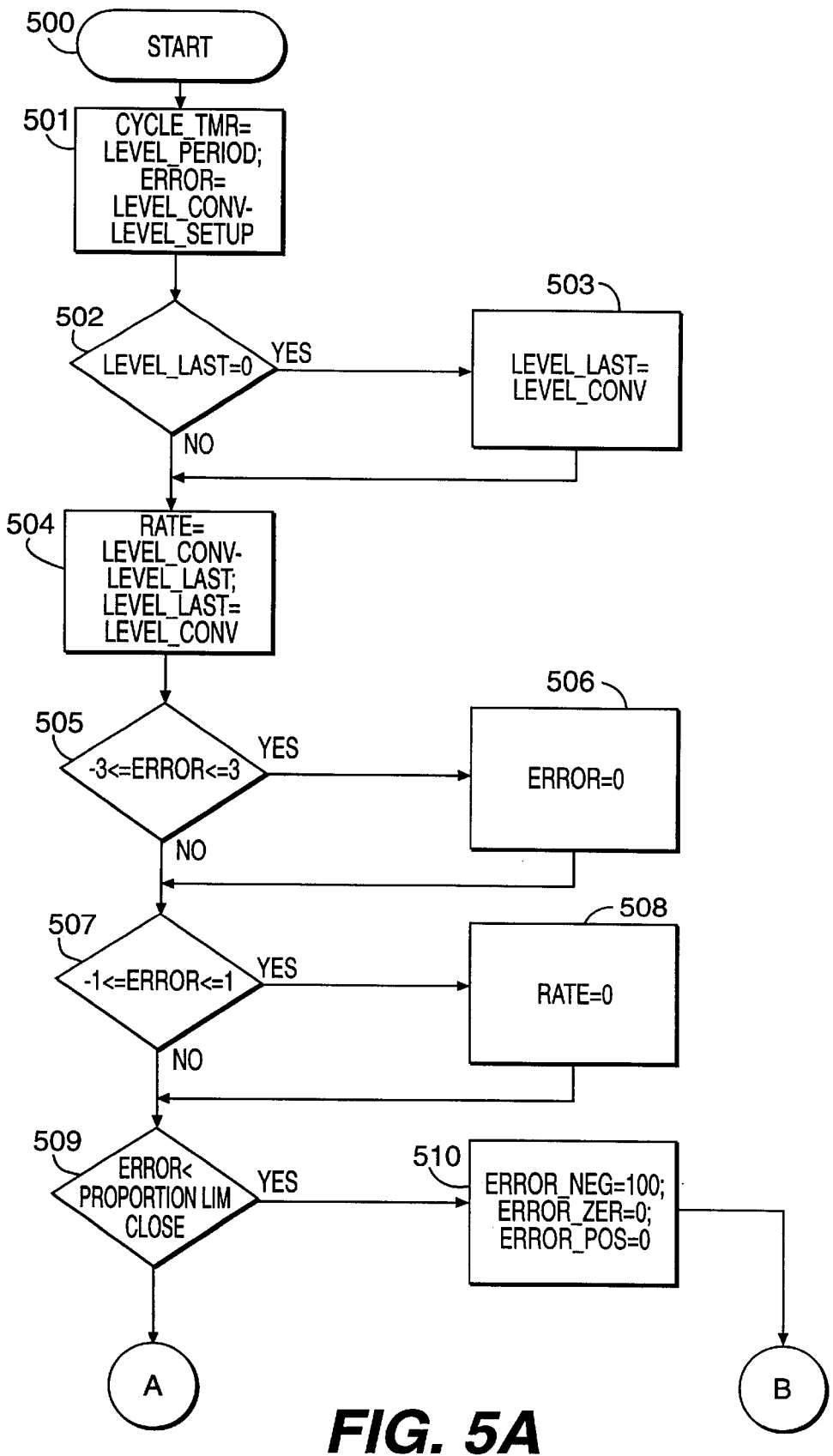
FIGS. 5A–5E are flow charts illustrating operations performed by a microprocessor in accordance with an embodiment of the present invention.
Figure 5B:
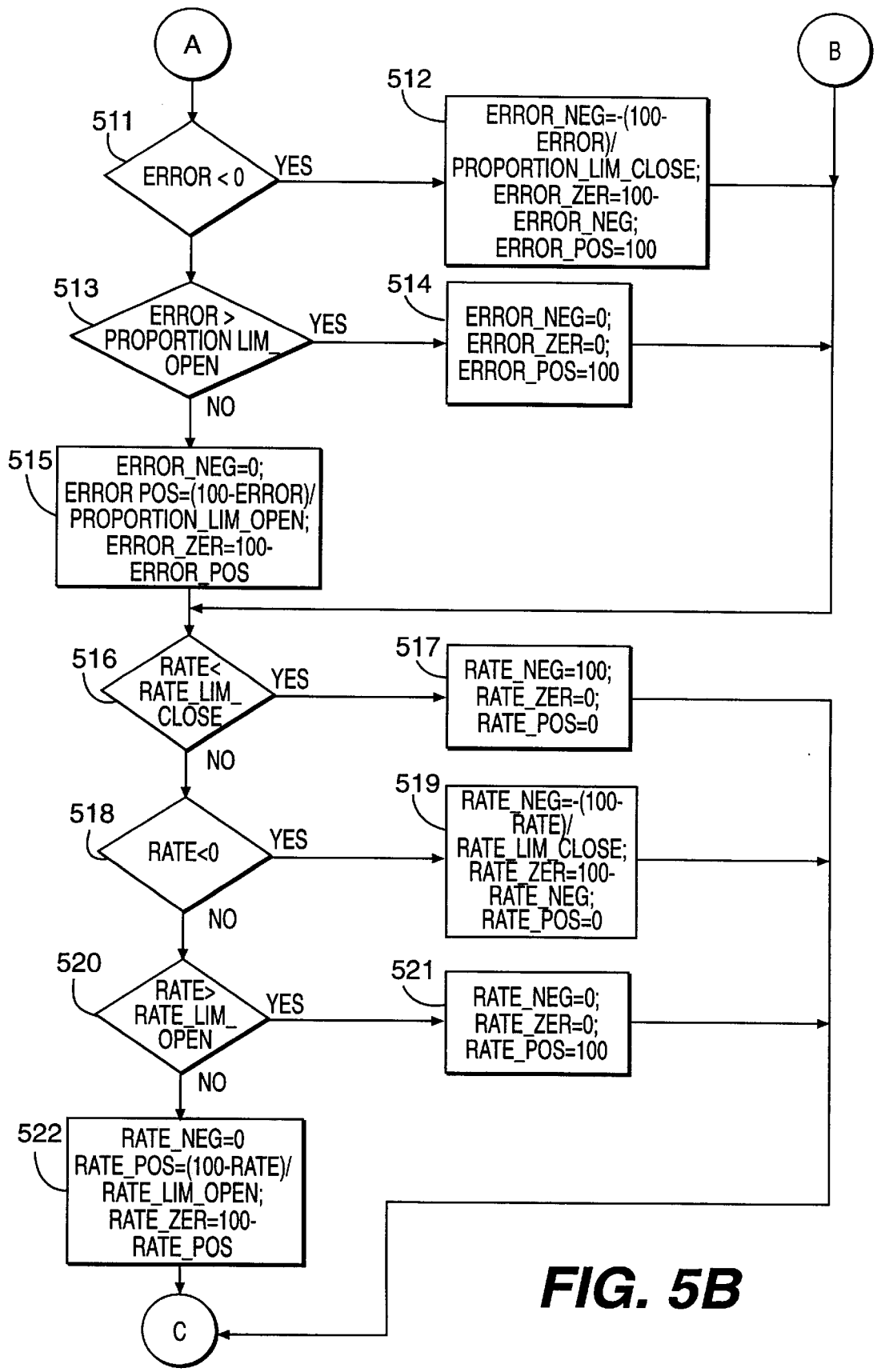

As shown in FIG. 5(B), subroutine A begins by determining whether the level ERROR is less than zero, i.e., negative (step 511). If the level ERROR is negative, the routine sets level error ERROR_NEG equal to –(100–ERROR) divided by the variable PROPORTION LIM_CLOSE; sets the level error ERROR_ZER to 100 minus ERROR_NEG; and sets level error ERROR_POS equal to zero (step 512). If the ERROR in step 511 is found to be greater than or equal to zero, then the routine compares the ERROR value to PROPORTION_LIM_OPEN, a variable independently programmable between 10 and 50 percent (step 513). The routine sets the error level ERROR_NEG and ERROR_ZER to zero and the ERROR_POS to 100 (step 514) when the ERROR is greater than PROPORTION_LIM_OPEN. Otherwise, the routine sets ERROR_NEG equal to zero; ERROR_POS equal to (100−ERROR) divided by PROPORTION_LIM_OPEN; and ERROR_ZER to 100 minus ERROR_POS (step 515).

Subroutine B is then entered to determine the degree of membership of the level error rate. The routine determines whether the level error RATE is less than RATE_LIM_CLOSE, a variable programmable between 10 and 50 percent (step 516), and if so the error rate RATE_NEG is set to 100, and RATE_ZER and RATE_POS to zero membership (step 517). Otherwise, the routine determines whether the level error RATE is less than zero, i.e., negative (step 518). If the level error RATE is negative, the routine sets level error rate RATE_NEG equal to −(100−RATE) divided by the variable RATE_LIM_CLOSE; sets the level error rate RATE_ZER to 100 minus RATE_NEG; and sets level error rate RATE_POS equal to zero (step 519). If the RATE in step 518 is found to be greater than or equal to zero, then the routine compares the RATE value to RATE_LIM_OPEN, a variable independently programmable between 10 and 50 percent (step 520). The routine sets the rate level RATE_NEG and RATE_ZER to zero and the RATE_POS to 100 (step 521) when the RATE is greater than RATE_LIM_OPEN. Otherwise, the routine sets RATE_NEG equal to zero; RATE_POS equal to (100−RATE) divided by RATE_LIM_OPEN; and RATE_ZER to 100 minus RATE_POS (step 522).

Figure 5C:
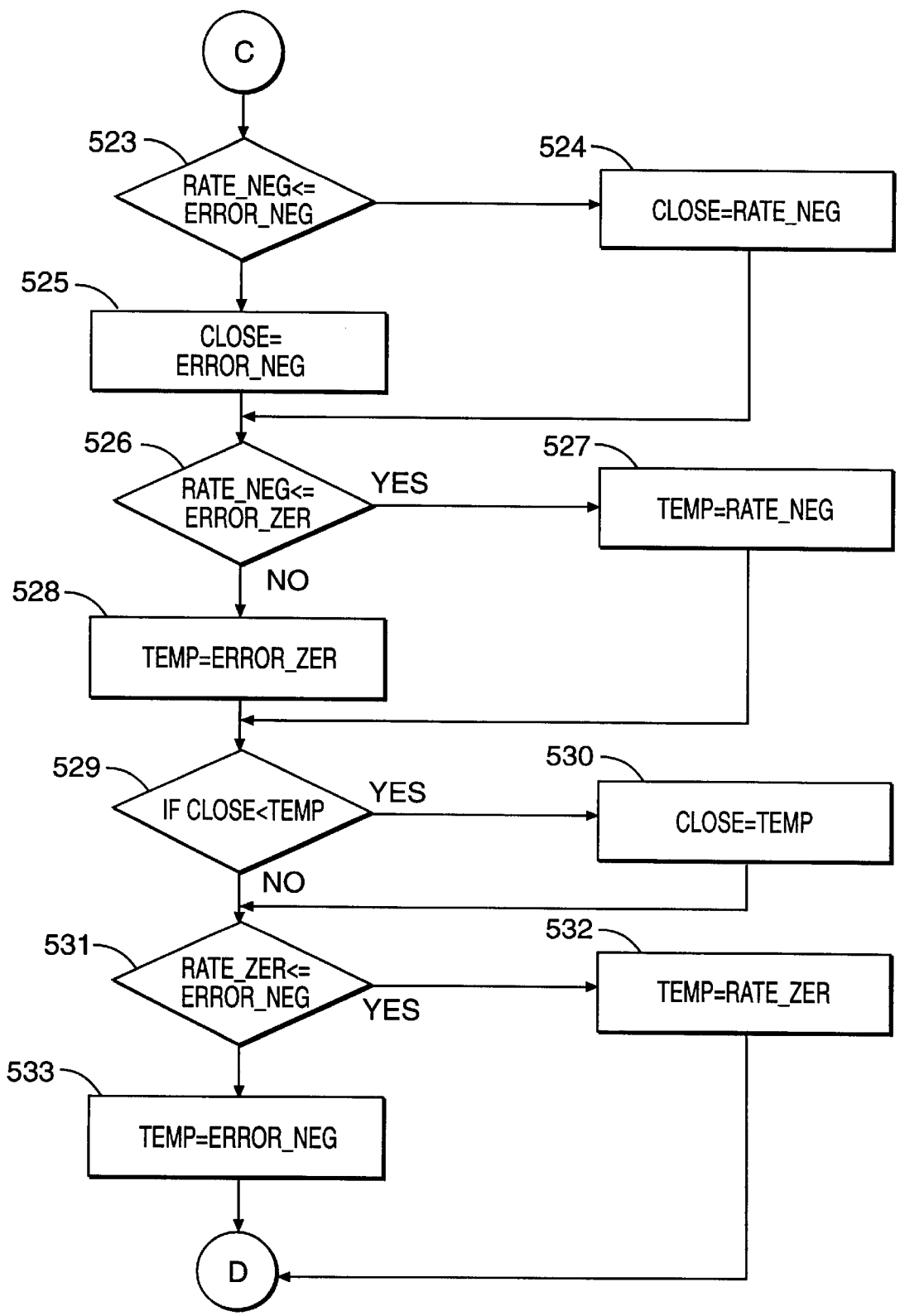

FIG. 5(C), subroutine C, represents the minimum fuzzy valve close inferencing technique described above. Here it is determined whether the negative level error rate RATE_NEG is less than or equal to the negative level error ERROR_NEG (step 523). If so, the valve close contribution CLOSE is set equal to the negative level error rate RATE_NEG, i.e., the minimum value (step 524). Otherwise the valve close contribution CLOSE is set equal to the negative level error ERROR_NEG (step 525). At this point, the valve close contribution CLOSE is equal to the second valve close contribution $C_2$.

The routine then determines whether the negative level error rate RATE_NEG is less than or equal to the zero level error ERROR_ZER (step 526), and if so a dummy variable TEMP is set equal to the negative level error rate RATE_NEG (step 527). Otherwise the dummy variable TEMP is set equal to the zero level ERROR_ZER (Step 528). At this time, the dummy variable TEMP represents the first valve close contribution $C_1$.

The routine determines whether the valve close contribution CLOSE is less than the dummy variable TEMP (step 529), and if so the valve close contribution CLOSE is made equal to the dummy variable TEMP (step 530). This operation is equivalent to finding the maximum valve close contribution between the first and second close contributions $C_1$, $C_2$. If the routine finds that the zero level error rate RATE_ZER is less than or equal to the negative level error ERROR_NEG (step 531), then the dummy variable TEMP is set equal to the zero level error rate RATE_ZER (step 532). Otherwise the dummy variable TEMP is set equal to the negative level error ERROR_NEG (step 533). Subroutine D is then entered. The dummy variable TEMP now represents the third close contribution $C_3$.

Figure 5D:
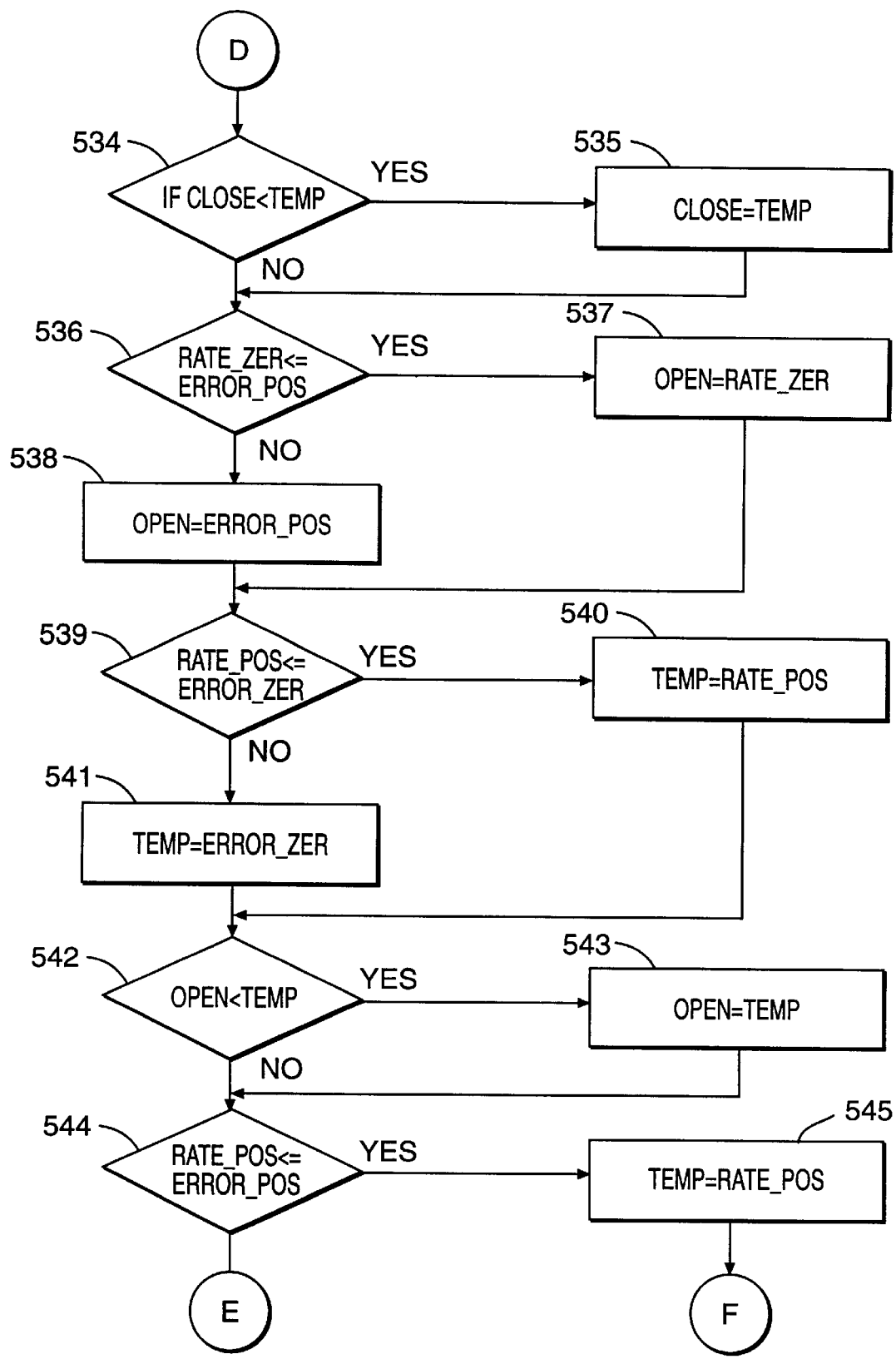

As shown in FIG. 5(D), subroutine D begins by determining whether the close contribution CLOSE, which represents the maximum close contribution between the first and second close contributions $C_1$, $C_2$, is less than the dummy variable TEMP, which represents the third close contribution $C_3$ (step 534). If so, the close contribution CLOSE is set equal to the dummy variable TEMP (step 535). After this operation, the maximum close contribution has been determined and is stored as CLOSE.

The remainder of subroutine D represents the minimum fuzzy open inferencing technique described above and begins by determining whether the zero level error rate RATE_ZER is less than or equal to the positive level error ERROR_POS (step 536). If so, the open contribution OPEN is set equal to the zero level error rate RATE_ZER, i.e., the minimum value (step 537). Otherwise the open contribution OPEN is set equal to the positive level error ERROR_POS (step 538). At this time, the open contribution OPEN is equal to the first open contribution $O_1$.

The routine determines whether the positive level error rate RATE_POS is less than or equal to the zero level error ERROR_ZER (step 539). If so, the dummy variable TEMP is set equal to the positive level error rate RATE_POS (step 540). Otherwise the dummy variable TEMP is set equal to the zero level error ERROR_ZER (step 541). At this time, the dummy variable TEMP represents the third open contribution $O_3$. If the open contribution OPEN is less than the dummy variable TEMP (step 542), then the open contribution OPEN is made equal to the dummy variable TEMP (step 543). This operation is equivalent to finding the maximum open contribution between the first and third open contributions $O_1$, $O_3$. If the positive level error rate RATE_POS is less than or equal to the positive level error ERROR POS (step 544), then the dummy variable TEMP is set equal to the positive level error rate RATE_POS (Step 545) and subroutine F is entered, otherwise subroutine E is entered.

Figure 5E:
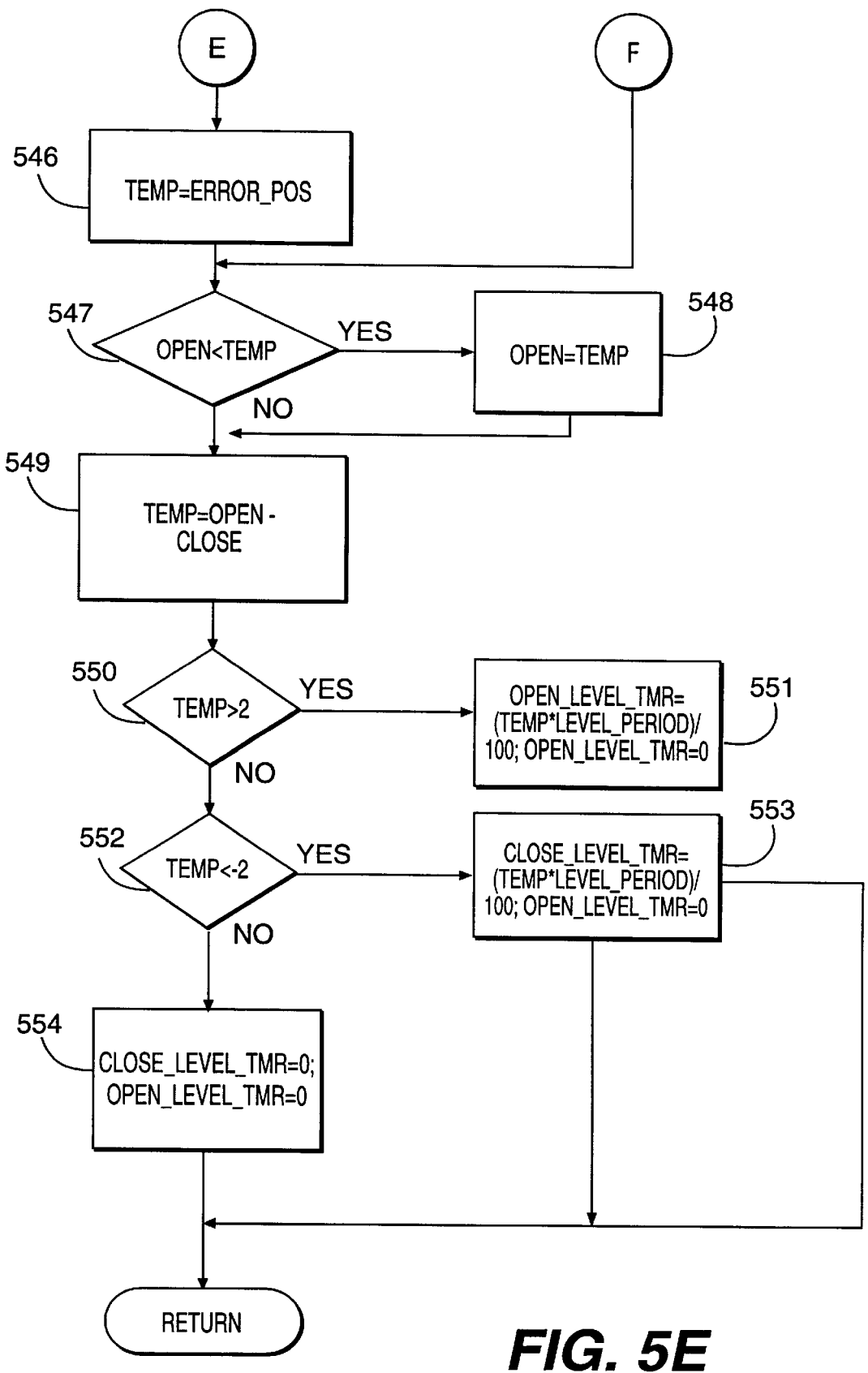

As shown in FIG. 5(E), subroutine F is the same as subroutine E except that it bypasses step 546. In step 546, the dummy variable TEMP is set equal to the positive level error ERROR_POS. The dummy variable TEMP now represents the second open contribution $O_2$. As further shown in FIG. 5(e), step 547 determines whether the open contribution OPEN, which represents the maximum open contribution between the first and third open contributions $O_1$, $O_3$, is less than the dummy variable TEMP, which now represents the second open contribution $O_2$. If so, then the open contribution OPEN is set equal to the dummy variable TEMP (step 548). After this operation, the maximum open contribution has been determined and is stored as OPEN in the microprocessor 160.

Subroutine E continues with step 549, where the dummy variable TEMP is set equal to the difference between the maximum open contribution OPEN and the maximum close contribution CLOSE. This operation is equivalent to the singleton approach of de-fuzzification. The routine determines whether the TEMP value is greater than 2 (step 550) and if so the valve is pulsed open for a time represented by the variable OPEN_LEVEL_TMR which is equal to TEMP times the LEVEL_PERIOD divided by 100 (step 551). The CLOSE_LEVEL_TMR is set to zero (step 551) because no close pulse is desired.

If the routine determines that the TEMP value is less than negative two (step 552), then the CLOSE_LEVEL_TMR is set equal to TEMP times the LEVEL_PERIOD divided by one-hundred representing the amount of time the valve is to be pulsed close, and the OPEN_LEVEL_TMR is set to zero representing that the valve is not to be pulsed open (step 553). If TEMP is not greater than two or less than negative two then the CLOSE_LEVEL_TMR and the OPEN_LEVEL_TMR are set to zero (step 554) representing that no valve pulsing need occur.

As can be seen from the foregoing disclosure, the present invention utilizes a level probe to measure a level of refrigerant liquid in a condenser which is then used in a fuzzy logic control algorithm in order to quickly and accurately control a level of refrigerant liquid in a condenser. Thus, the chiller system can be controlled to operate at the most efficient operating point.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A refrigeration system comprising:
    an evaporator, a compressor, a condenser, and an expansion device, all connected in a closed refrigeration circuit through which refrigerant is cycled;
    refrigerant liquid within the condenser;
    a sensor for measuring the liquid refrigerant level in the condenser and providing a measurement signal;
    said expansion device being capable of selectively varying the degree of restriction it applies to the flow of refrigerant as it flows through the device in response to a control signal; and
    a microprocessor control which samples the measurement signal at selected intervals and applies the sampled measurement signals in a programmable predetermined manner designed to minimize or eliminate the flow of gas refrigerant to said evaporator.

2. The refrigerator system of claim 1, wherein said sensor measures the level of liquid refrigerant in the condensor.

3. The refrigeration system of claim 2, wherein said expansion device includes a multi-position valve.

4. The refrigeration system of claim 3, wherein said control generates a control signal that periodically pulses said valve in the open and closed direction in order to drive the liquid level in the condenser to a preselected setpoint level.

5. The refrigeration system of claim 4, wherein said microprocessor applies the sampled measurement signals to a fuzzy logic algorithm.

6. A refrigeration system comprising:
    an evaporator, a compressor, a condenser and an expansion device, all connected in a closed refrigeration circuit, through which refrigerant is cycled,
    refrigerant liquid in the condenser;
    a sensor for measuring the refrigerant liquid level in the condensor and providing a measurement signal;
    said expansion device being positioned between the evaporator and the condenser and being capable of selectively varying the degree of restriction it applies to the flow of refrigerant between the condenser and the evaporator in response to a control signal; and
    a microprocessor control which receives the measurement signal from the sensor and develops the control signal to thereby control the flow of refrigerant from the condensor to the evaporator, wherein the control uses a fuzzy logic algorithm having programmable fuzzy logic membership functions to minimize or eliminate the flow of gas refrigerant to said evaporator.

7. The refrigeration system of claim 6 where said sensor is a liquid level sensor that measures the level of liquid refrigerant in the condensor.

8. The refrigeration system of claim 7 wherein said liquid level sensor is a capacitance type liquid level sensor.

9. The refrigeration system of claim 6 wherein said expansion device includes a multi-position valve that opens and closes according to said control signal.

10. The refrigeration system of claim 9 wherein said microprocessor develops a control signal that selectively opens and closes said valve to drive the liquid level of refrigerant in the condenser to a preselected setpoint level.

11. A refrigeration system of claim 10, wherein the microprocessor opens the valve, relative to its previous position, when the level of refrigerant liquid measured in the condenser is higher than the preselected setpoint level.

12. The refrigeration system of claim 10, wherein the microprocessor closes the valve, relative to its previous position, when the level of refrigerant liquid measured in the condenser is lower than the preselected setpoint level.

13. The refrigeration system of claim 10, wherein the valve acts as an expansion device.

14. The refrigeration system of claim 10, wherein the microprocessor periodically samples the liquid level measured by the liquid level sensor, and wherein for each sampling period the microprocessor executes a fuzzy logic algorithm.

15. The refrigeration system of claim 14, wherein said microprocessor calculates a level error value equal to the difference between the measured level of the refrigerant liquid and the preselected setpoint level and applies this level error value to a fuzzy logic algorithm.

16. The refrigeration system of claim 15, wherein said microprocessor calculates a refrigerant level change rate by subtracting the refrigerant level measured during the previous sampling period from the refrigerant level measured during the current sampling period and applies this level change rate to a fuzzy logic algorithm.

17. The refrigeration system of claim 16, wherein the microprocessor, using the fuzzy logic algorithm, determines individually the degree of membership (negative, zero, or positive) associated with the refrigerant level change rate and the level error value by assigning a preselected weight to each calculation.

18. The refrigeration system of claim 12, wherein the microprocessor, using the fuzzy logic algorithm, evaluates rules based on the calculated degrees of membership for opening and closing said valve.

19. The refrigeration system of claim 17 wherein symmetrical and asymmetrical membership functions determine the degree of membership.

20. The refrigeration system of claim 13, wherein the microprocessor using the fuzzy logic algorithm, applies the fuzzy minimum/maximum method, which performs "fuzzy AND" (minimum) inferencing first, followed by "fuzzy OR" (maximum) inferencing, to yield close and open contributions.

21. The refrigeration system of claim 6, wherein the fuzzy logic algorithm uses as input variables the value of refrigerant liquid input variables detected by said sensor at a given time and the rate of change of that value at a given time, relative to an earlier time of detection.

* * * * *